United States Patent
Riccius et al.

[11] Patent Number: 5,983,840
[45] Date of Patent: Nov. 16, 1999

[54] STEAM GENERATOR WITH INTEGRATED DUST SEPARATOR

[75] Inventors: Oliver Riccius, Baden; Georg Ziegler, Winterthur, both of Switzerland

[73] Assignee: Asea Brown Boveri AG, Baden, Switzerland

[21] Appl. No.: 09/153,846

[22] Filed: Sep. 16, 1998

[30] Foreign Application Priority Data

Sep. 23, 1997 [EP] European Pat. Off. .............. 97810699

[51] Int. Cl.⁶ ...................................................... F22D 1/00
[52] U.S. Cl. ............................................. 122/4 D; 110/245
[58] Field of Search ............................... 122/4 D; 110/245

[56] References Cited

FOREIGN PATENT DOCUMENTS

| 0177667A1 | 4/1986 | European Pat. Off. . |
| 0748647A1 | 12/1996 | European Pat. Off. . |
| 2805671 | 9/1978 | Germany . |
| WO90/05020 | 5/1990 | WIPO . |

*Primary Examiner*—Teresa Walberg
*Assistant Examiner*—Jiping Lu
*Attorney, Agent, or Firm*—Burns, Doane, Swecker & Mathis, L.L.P.

[57] ABSTRACT

The invention relates to a steam generator, which consists of a combustion chamber (1), a radiation part (2) and a convection part (3) and which has at least two vertical gas passes (4, 5) following the combustion chamber (1), in each case with a 180° deflection of the flue gas (12), the combustion chamber (1) and the gas pass (4) being separated from one another by means of a first partition (14) and the two gas passes (4, 5) being separated from one another by means of a second partition (6). It is defined in that the second partition (6) is designed, at its lower end, in such a way that the passage area for the flue gas (12) from the vertical pass (4) with downward flow to the vertical pass (5) with upward flow has a variable value over the width, the passage area being smaller in the middle than on the outside. The secondary flow occurring during deflection is thereby reinforced, in the wall region the vortices of said secondary flow rotating opposite to the direction of the main flow deflection. The discharge of dust is considerably improved in this way.

10 Claims, 8 Drawing Sheets

STEAM GENERATOR WITH INTEGRATED DUST SEPARATOR

BACKGROUND OF THE INVENTION

1. Field of the Invention

The invention relates to a steam generator with integrated dust separator, the steam generator consisting of a combustion chamber, a radiation part and a convection part and having at least two vertical gas passes following the combustion chamber, each with 180° gas deflection.

2. Discussion of Background

At the present time, the boilers used for garbage incineration plants (GIP) in Central European countries are preferably those in which the gas flowing out of the combustion chamber flows via a first empty pass with downward flow into a second empty pass with upward flow and subsequently into a horizontal bunching pass. In addition to these horizontal steam generators, vertical steam generators for garbage incineration plants are also known, these usually being of the 3-pass or 4-pass type (K. J. Thome-Kozmiensky: Thermische Abfallbehandlung [Thermal Waste Treatment]. EF Verlag fur Energie und Umwelttechnik GmbH, 1994, Pages 390 to 402). Grate furnaces with a connected multipass boiler are also often employed in the incineration of solids, such as wood and biomass. In the empty passes, inter alia, fly ash is separated and discharged. Fly ash is a problem material, particularly in garbage incineration, since fly ash is highly contaminated and has to be disposed off as special garbage.

The empty passes of steam generators have hitherto been designed predominantly as rectangular ducts, their longitudinal sections being largely identical.

Whilst importance has hitherto only been attached to an operationally reliable discharge of the dust which falls from the walls by being cleaned off or by flaking off, the quantity of dust at the end of the boiler has in the meantime become a quality feature for incineration and the boiler and has to be guaranteed to the customer.

In the furnaces described above, a relatively large amount of dust (2–5 $g/Nm^3$) is carried along from the combustion chamber. This high dust fraction is undesirable since it causes the following problems:

The dust settles on the heating surfaces, so that these have to be overdimensioned correspondingly. Moreover, they have to be built in such a way that they can be cleaned by tapping or soot blasting.

In the gas scrubbing plant downstream of the boiler, costly electrostatic filters and washers have to be used for dedusting.

In the horizontal part of the boiler, the precipitated dust is conducive to the catalytic formation of dioxin. This reaction (Denovo synthesis) takes place when gas containing oxygen and chlorine fractions comes into contact, at a temperature of between 250 and 500° C. and with a dwell time of several seconds, with a catalyst (in the present case, the dust acts as a catalyst). Flue gas and dust, which are virtually free of dioxin after incineration, become dioxin-containing again below 500° C. as a result of this Denovo synthesis.

The dumping of dioxin-containing dust is a costly environmental problem.

The scrubbing of dioxin-containing waste gases is highly complicated.

Recent tenders demand a dust content of crude gases of 1–2 $g/Nm^3$ which can no longer be adhered to by means of firing measures alone. For a "high dust-SCR (Selective Catalytic Reduction)" plant (NOx catalysts are arranged upstream of flue gas scrubbing and upstream of the electrostatic filter), even a dust content of <1 $g/Nm^3$ is required, since, because of this arrangement, the flue gas denitrogenation reactor is loaded with dust and has only a reduced service life.

DE 28 05 671 A1 and EP 0 177 667 A1 disclose devices for improving the flow deflection of flue gases in a multipass boiler, in which devices guide plates or n-bladed blade cascades are arranged in the region of the deflection of the vertical pass. These are designed in such a way that, as far as possible, no breakaways (less pressure loss, fewer dust deposits) occur. As compared with steam generators having vertical passes without such guide plates or guide cascades in the deflection region, these solutions regarding the gas flows, although constituting an improvement, are nevertheless completely unsuitable in terms of effective dust separation.

EP 0 748 647 A1 discloses a method and an apparatus for reducing the dust content in steam generators having at least two vertical passes of the type described above. The method is defined in that, in the region of gas deflection from the vertical pass with downward flow to the vertical pass with upward flow, dust separation at this point is improved by the provision of flow-calmed zones and the dust is discharged directly from this region. The corresponding apparatus is defined in that, in these regions, the front wall and/or rear wall of the steam generator is of double-walled design, the flow-calmed zones, in which the dust is separated effectively, being located between the two walls. In a design variant, the partition between the vertical passes is bent in its lower region in the direction of the vertical pass with downward flow, so that the cross-sectional area of the gas duct is reduced in this region.

The disadvantage of such a solution, however, is that the additional fittings (second inner wall with baffle plates) are at risk of becoming clogged.

SUMMARY OF THE INVENTION

The invention attempts to avoid all these disadvantages. The object on which it is based is to provide a steam generator with integrated dust separator, the steam generator having at least two vertical gas passes following the combustion space, in each case with 180° gas deflection, and in which the separation of the dust is improved without disturbing fittings in the deflection zone of the vertical gas passes.

In a steam generator, which consists of a combustion chamber, a radiation part and a convection part and which has at least two vertical gas passes, in each case with 180° deflection of the flue gas, the combustion chamber and the first gas pass being separated from one another by means of a first partition and the two gas passes being separated from one another by means of a second partition, and a funnel with at least one orifice for the discharge of dust being arranged in the region of the deflection of the flue gas from the vertical pass with downward flow to the vertical pass with upward flow, this is achieved, according to the invention, in that the second partition is designed, at its lower endy in such a way that the passage area for the flue gas, from the vertical pass with downward flow to the vertical pass with upward flow has a variable value over the width, the passage area being smaller in the middle than on the outside.

The advantages of the invention are that the separation of dust from the dustladen flue gas is substantially improved in the region of flow deflection. There are no fittings which are at risk of becoming clogged, but, instead, the flow in the boiler is used for dust separation, in particular by utilizing and reinforcing its threedimensional structure which occurs due to the 180° flow deflection. Inertial and lifting forces give rise to a secondary flow which leads to a double spiral movement of the gases. The spiral movement also encroaches on the dust particles and may be used to separate them if it is appropriately reinforced.

It is expedient if, in addition, the first partition is designed, at its upper end, in such a way that the passage area for the flue gas from the combustion chamber to the vertical pass with downward flow has a variable, that is to say nonconstant value over the width, the passage area being larger in the middle than on the outside. The secondary flow is thereby additionally reinforced and dust separation may be further improved.

It is advantageous if the steam generator has a partition between the downward pass and the upward pass (second partition), the lower end of which partition is designed in the form of a plowshare, the ridge, that is to say the edge of the side faces, forming the lower end of the partition and projecting into the gas duct with downward flow. The gas duct is therefore narrowed in its middle part. As a result of this preferred design variant, on the one hand, the flow is deflected outward to the side wall of the gas pass and, on the other hand, the direction of rotation of the gas vortices generated during each sharp flow deflection is changed, since the gas vortices flow downward in the wall region, that is to say their direction of rotation at the deflection from the downward pass to the upward pass is opposite to the direction of rotation which would be established without the solution according to the invention.

It is also advantageous if the lower end of the partition is not of threedimensional, but, like the remaining partition, of plane design, the lower end being V-shaped or stair-shaped or trapezoidal. The secondary flow is likewise reinforced and dust separation is improved due to the secondary vortex. This effect is further reinforced if the lower end of the partition is angled in the direction of the vertical pass with downward flow.

These advantageous embodiments of the lower end of the second partition are also advantageous to the upper end of the first partition. A combination of these partitions designed according to the invention leads to the secondary flow being further reinforced and dust separation being improved even more.

Furthermore, it is expedient if the vertical gas pass with downward flow is subdivided into at least two ducts separated from one another by side walls. Two or more ducts, each with a double spiral, are thereby produced and, together with the additional side walls, bring about an improved separation of the dust particles.

Moreover, it is expedient if at least two discharge orifices for the dust are provided at the lowest point of the deflection, said orifices absorbing and stabilizing the double vortices located there. The vortices persist better in two funnels than in only one, because the rebound area advantageous for separation is then greater.

Finally, it is advantageous if all the ducts or all the parts involved in gas deflection are integrated in the natural circulation system of the steam generator, and if cleaning-off devices, preferably tapping mechanisms on the side walls, are provided for removing the dust.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, which illustrate several exemplary embodiments of the invention with reference to a steam generator with two vertical empty passes and with a horizontal bunching pass, as are often used for garbage incineration plants, and wherein.

Only the elements essential for understanding the invention are shown. Of the plant, for example, the incinerator grate and the slag removal system are not illustrated. The direction of flow of the media is designated by arrows.

DESCRIPTION OF THE PREFERRED EMBODIMENTS

Figure 1:
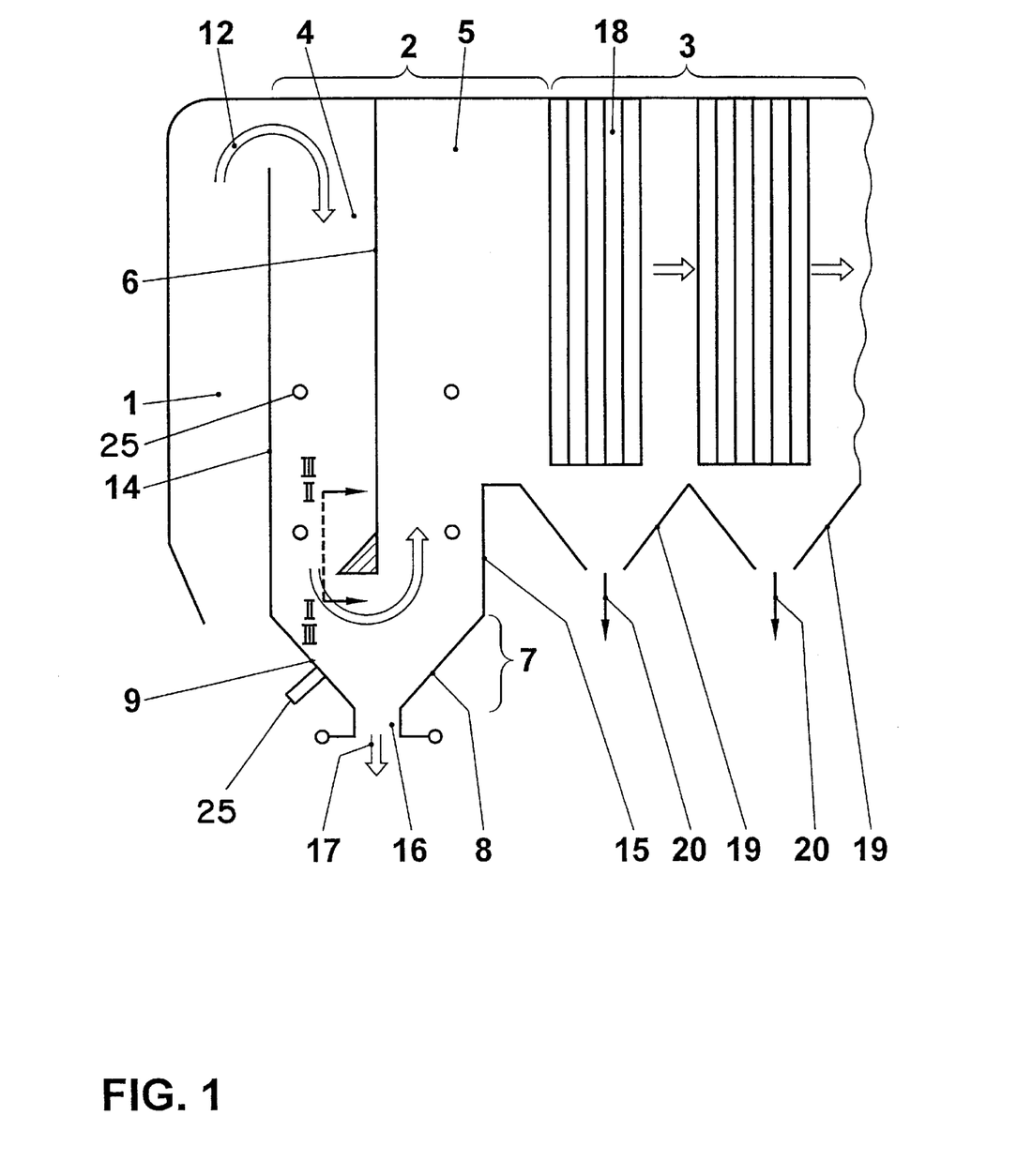
FIG. 1 shows a part longitudinal section through a steam generator according to the invention in a first design variant.

Referring now to the drawings, wherein like reference numerals designate identical or corresponding parts throughout the several views, FIG. 1 shows a part longitudinal section through a steam generator with a natural circulation system for a garbage incineration plant. The boiler is a so-called Dackel boiler which consists of a combustion chamber 1, a radiation part 2 and a convection part 3. The radiation part 2 possesses a first vertical empty pass 4 and a second vertical empty pass 5, the two passes 4, 5 being separated from one another by an essentially vertical partition 6. In the region of gas deflection between the two empty passes 4 and 5, the boiler walls 14, 15 narrow in a funnel-shaped manner. The funnel 7 formed by them and having the limiting walls 8 and 9 has, at its lower end, a discharge orifice 16 for the separated dust particles 17. The second vertical empty pass 5, that is to say the vertical pass with upward flow of the flue gas 12, is followed by the convection part 3 of the boiler. This consists of a horizontal bunching pass 18. Arranged on the underside of the horizontal pass 18 is a plurality of funnels 19, out of which further dioxin-containing fly dust 20 is discharged. The boiler described is thus far the known state of the art.

The waste gas 12 coming from the combustion chamber 1 and contaminated with dust particles first flows upward, is deflected through 180° at the entry into the first vertical empty pass 4 and passes downward via the gas pass 4, is deflected through 180° once again in the region of the funnel 7, then flows upward in the second vertical empty pass 5 and finally passes into the horizontal bunching pass 18, before it then flows into the gas scrubbing plant, not illustrated here, which is located downstream of the boiler.

The invention takes effect in the region of gas deflection from the first vertical empty pass 4 with downward flow to the second vertical empty pass 5 with upward flow of the flue gases 12. The partition 6 between the two passes 4 and 5 is designed, in its lower region, in such a way that the passage area for the flue gas 12 from the vertical pass 4 with downward flow to the vertical pass 5 with upward flow has a variable, that is to say nonconstant value over the width, the passage area being smaller in the middle than on the outside.

The waste gas 12 from the combustion chamber 1 of the garbage incineration plant has a relatively large amount of dust 17 (approximately 2–5 g/Nm$^3$). This high dust fraction is reduced by means of the device described, the reduction in the dust fraction of the flue gases 12 taking place before the flue gases 12 enter the convective part 3 of the boiler, specifically in the region of gas deflection from the vertical empty pass 4 with downward flow to the vertical empty pass 5 with upward flow. The dust 17, which is separated in this region, is discharged via the orifice 16 and is cooled by quenching or cooling, with oxygen being excluded, in such a way as to suppress the formation of dioxin. In a preferred embodiment, the dust particles are discharged at at least two points at the lowest point of the deflection, because the separation conditions for the dust particles are further improved thereby. This dioxin-free dust 17 is not mixed with the dioxin-containing fly dust 20 from the funnels 19 of the horizontal pass 18, so that appreciably fewer environmental problems arise. Cleaning-off devices, preferably tapping mechanisms, may be provided on the side walls in order to assist the discharge of dust.

Figure 2:
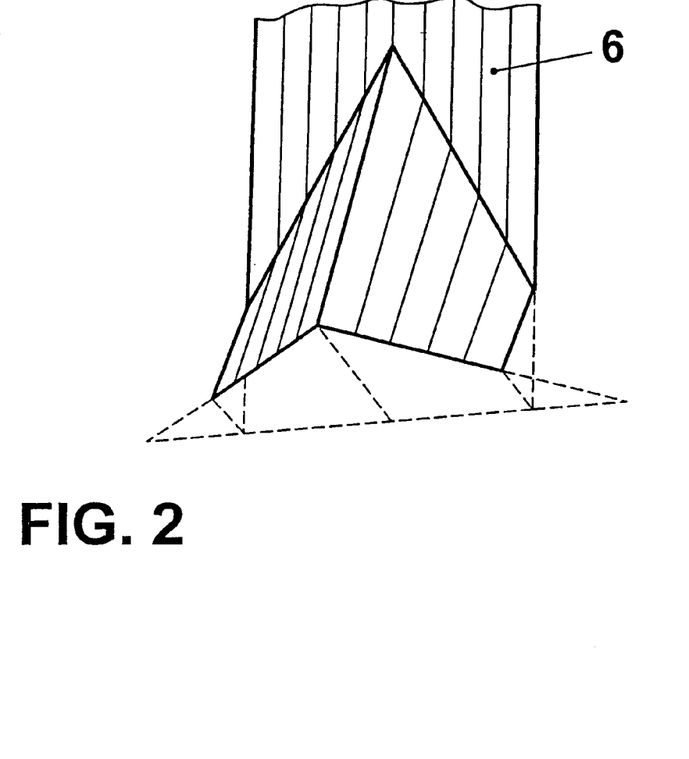
FIG. 2 shows a perspective view of the partition in a first design variant along the line II—II in FIG. 1.
Figure 3:
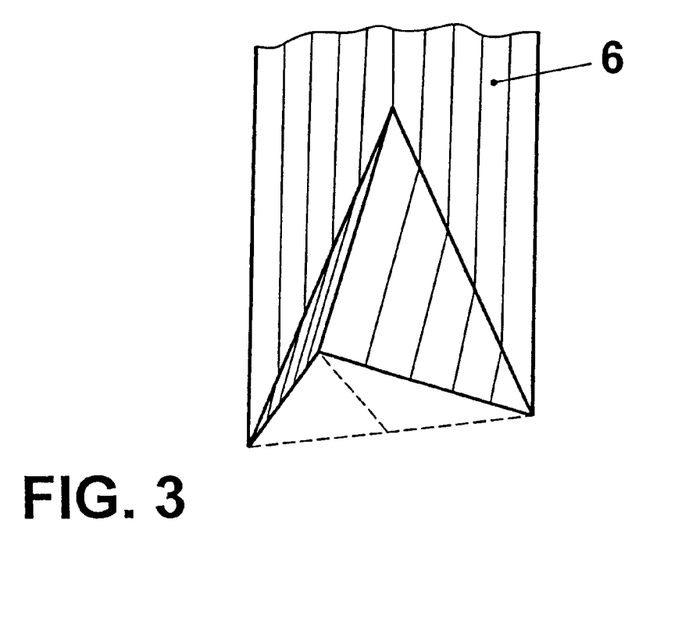
FIG. 3 shows a perspective view of the partition in a second design variant along the line III—III in FIG. 1.

In the exemplary embodiments illustrated in FIGS. 1, 2 and 3, the lower part of the partition 6 is designed in the form of a plowshare, as may be seen from the views according to FIGS. 2 and 3. The ridge of the "plowshare" is oriented in the direction of the middle of the gas duct of the downward pass 4, so that the flow is urged outward, that is to say toward the side wall 14 of the boiler.

Due to the lower end of the partition 6 being designed according to the invention, the threedimensional structure of the gas flow in the boiler is reinforced and is utilized for dust separation. This will be illustrated with reference to FIGS. 4 and 5.

Figure 4:
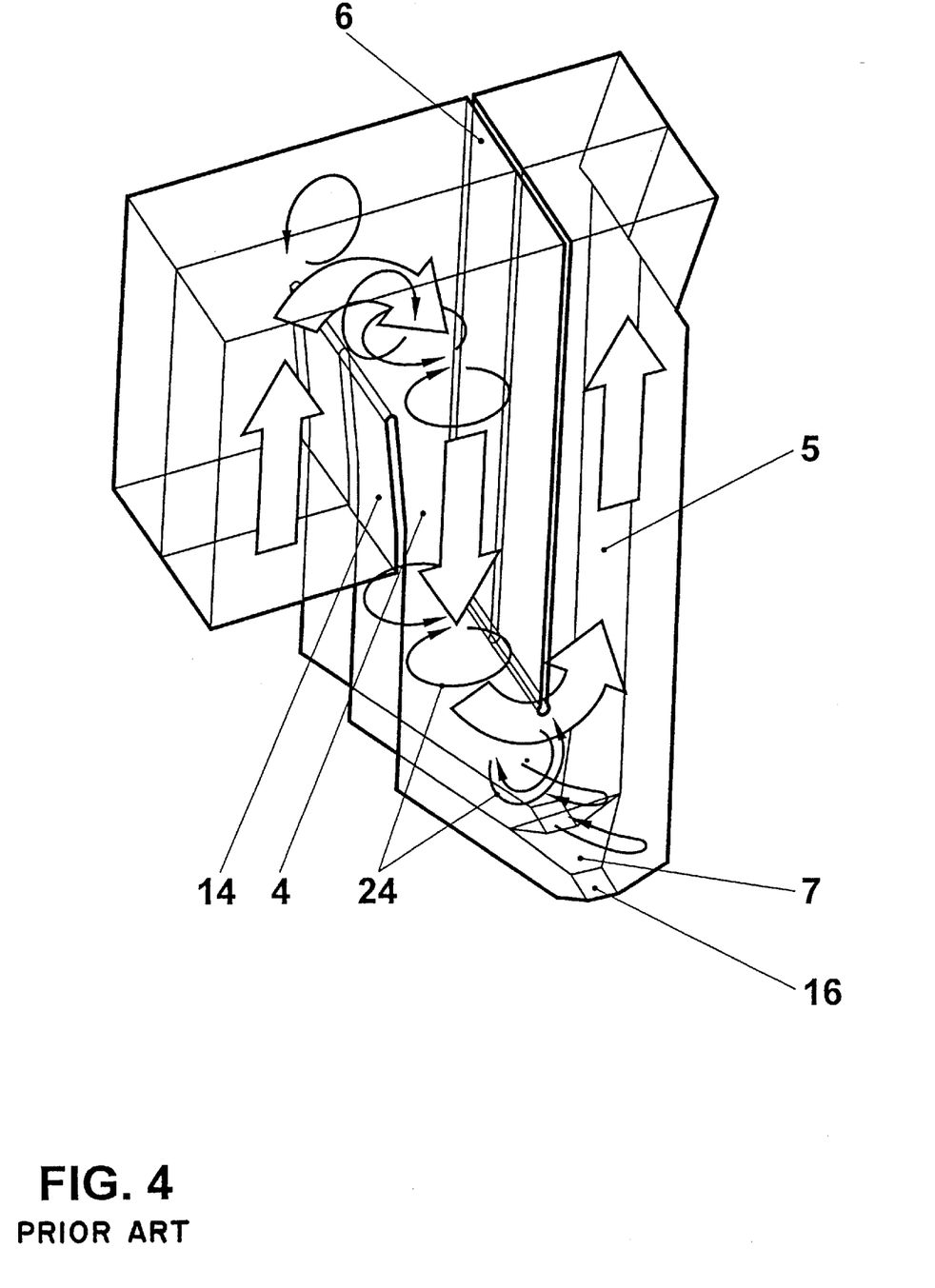
FIG. 4 shows a perspective illustration of the steam generator according to the known state of the art, with the flow profile being marked.
Figure 5:
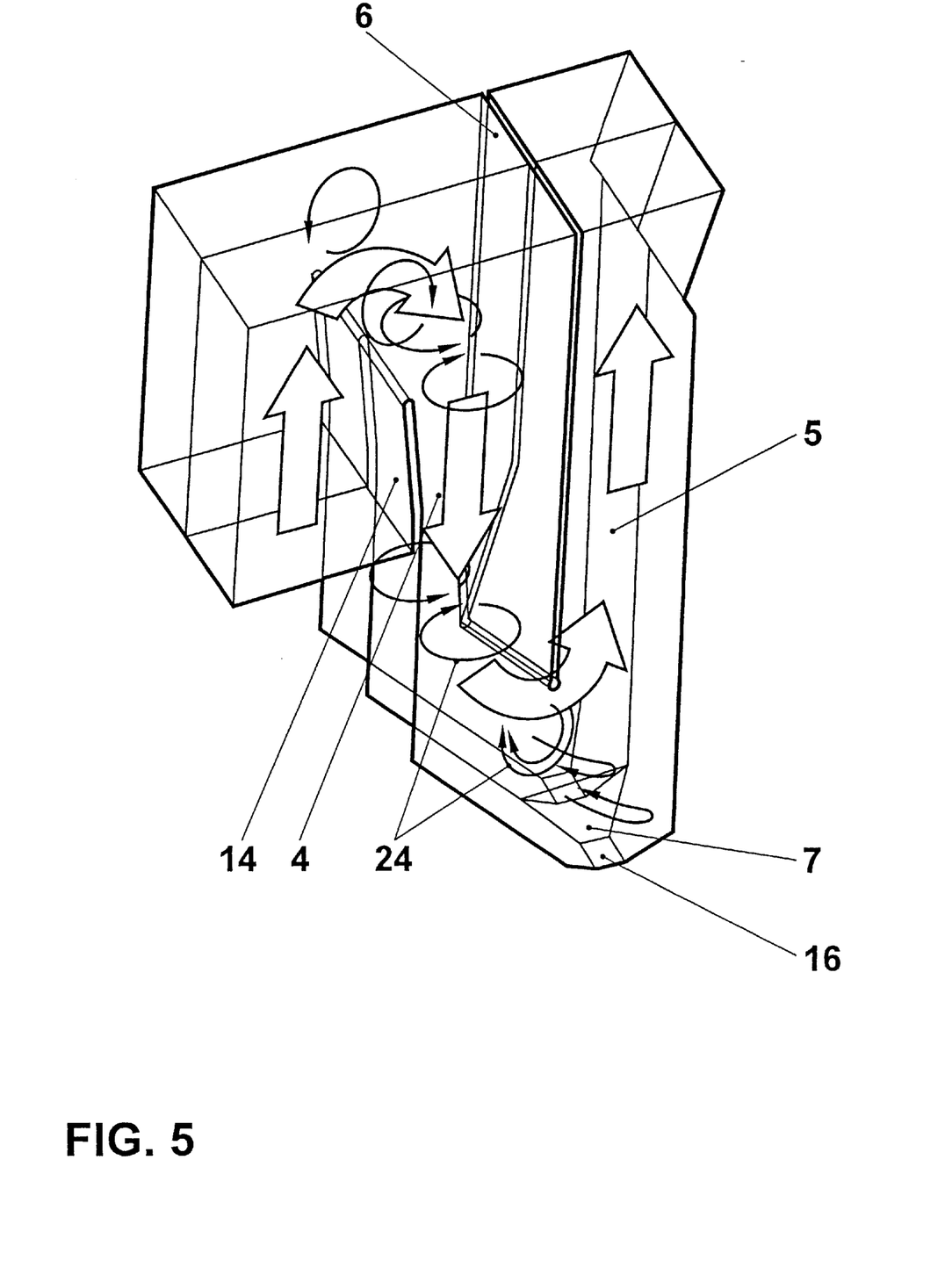
FIG. 5 shows a perspective illustration of the steam generator in the design variant according to the invention, as shown in FIG. 1, with the flow profile marked.

FIG. 4 shows a perspective illustration of the steam generator according to the known state of the art, with the flow profile marked, whilst FIG. 5 shows a perspective illustration of the steam generator in the design variant according to the invention, as shown in FIG. 1, with the flow profile marked. The thick arrows in each case symbolize the main flow of the flue gases 12 and the thin arrows the secondary flow.

When a gas flow is deflected, inertial and lifting forces give rise to a secondary flow which leads to a double spiral movement of the gases. Two gas vortex trains rotating in opposite directions occur, as may be seen both in FIG. 4 and in FIG. 5 at the entry into the duct 4. These secondary vortices flow downward. The spiral movement also encroaches on the dust particles. During the second gas deflection (from the gas pass 4 into the gas pass 5), secondary vortices 24 are induced once again, and, in the known state of the art according to FIG. 4 (plane partition, that is to say rectangular duct cross section), these now flow upward (in the direction of the main flow) and once more carry along the dust particles, that is to say the vortices occurring during the first deflection are largely canceled again during the second deflection, since they have the opposite direction of rotation.

By contrast, the design according to the invention of the lower part of the partition 6 (see FIG. 5), in which there is no longer a rectangular gas duct cross section in this region, but the clear width of the duct is the least in the middle of the partition 6, ensures that the double spirals (secondary vortices 24) occurring during the second deflection of the flue gases 12 rotate in the same direction as the spirals which occurred during the first deflection and reinforce these. The double spirals thus flow downward (opposite to the main flow direction) and can be utilized for separating the dust particles 17, because they discharge the particles toward the side walls and downward in a similar way to a cyclone. As a rule, the dust particles passing into the ash funnel 7 in the vicinity of the side walls are separated completely. The separation effect is further reinforced if there are at least two funnels 7, because the rebound areas necessary for dust separation are then greater.

Figure 6:
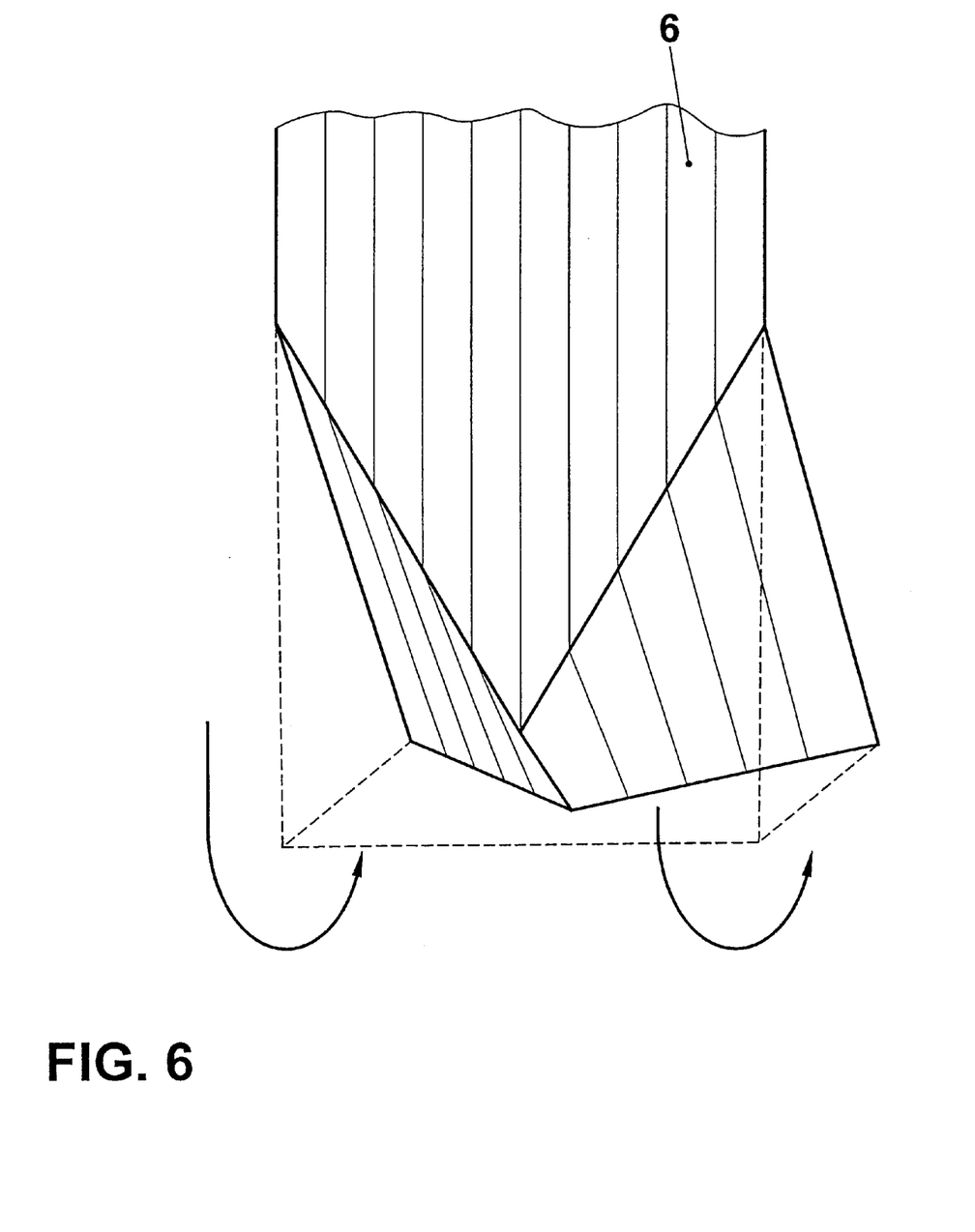
FIG. 6 shows a perspective view of the partition in a third design variant.

FIG. 6 shows a perspective view of the lower part of a partition 6 in a further design variant. Here too, the passage area for the flue gas 12 during deflection from the gas pass 4 with downward flow to the gas pass 5 with upward flow is not constant over the width of the partition 6, but is smaller in the middle than the outer regions. The same effects with regard to the secondary flow and dust separation as already described above can be achieved.

Figure 7:
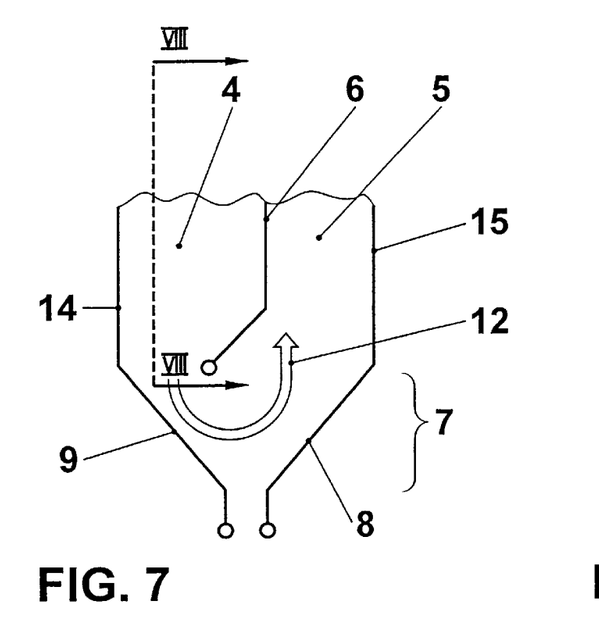
FIG. 7 shows a part longitudinal section in the deflection region between the gas pass with downward flow and the gas pass with upward flow in a fourth design variant of the steam generator according to the invention.
Figure 8:
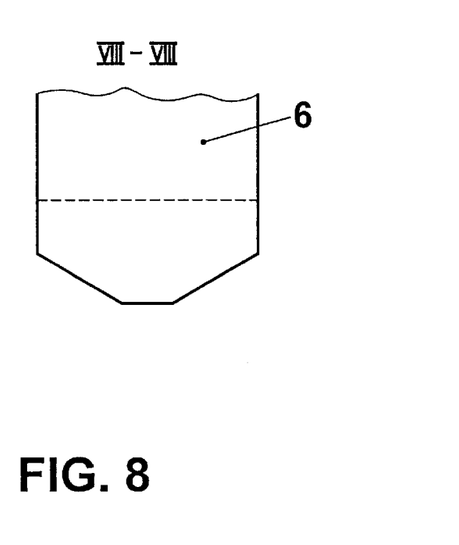
FIG. 8 shows a view along the line VIII—VIII in FIG. 7.

FIG. 7 shows a part longitudinal section in the deflection region between the gas pass 4 with downward flow and the gas pass 5 with upward flow in a fourth design variant of the steam generator according to the invention, whilst FIG. 8 illustrates a view along the line VIII—VIII in FIG. 7. The partition 6 is bent in its lower region in the direction of the middle of the gas pass 4, that is to say is angled in the direction of the side wall 14. The lowest bent part of the partition 6 is of trapezoidal design, said part being followed by a rectangular part of the partition 6, said rectangular part likewise also being bent. This shape ensures that the gas duct is narrowed in the middle of the partition 6, whereas it is not affected at the side of the partition 6. The gas flow is urged onto the side wall 14, and the secondary flow of the deflection is reinforced and is utilized, as described above, for dust separation.

Figure 9:
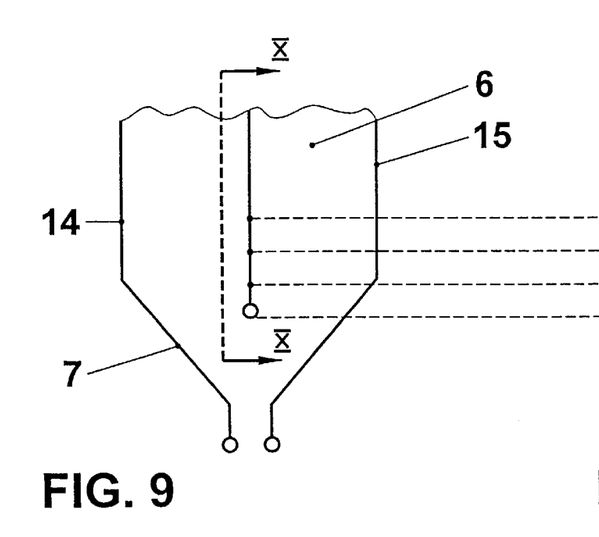
FIG. 9 shows a part longitudinal section in the deflection region between the gas pass with downward flow and the gas pass with upward flow in a fifth design variant of the steam generator according to the invention.
Figure 10:
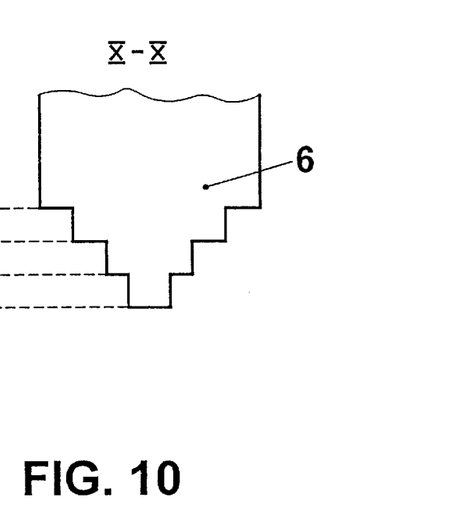
FIG. 10 shows a view along the line X—X in FIG. 9.
Figure 12:
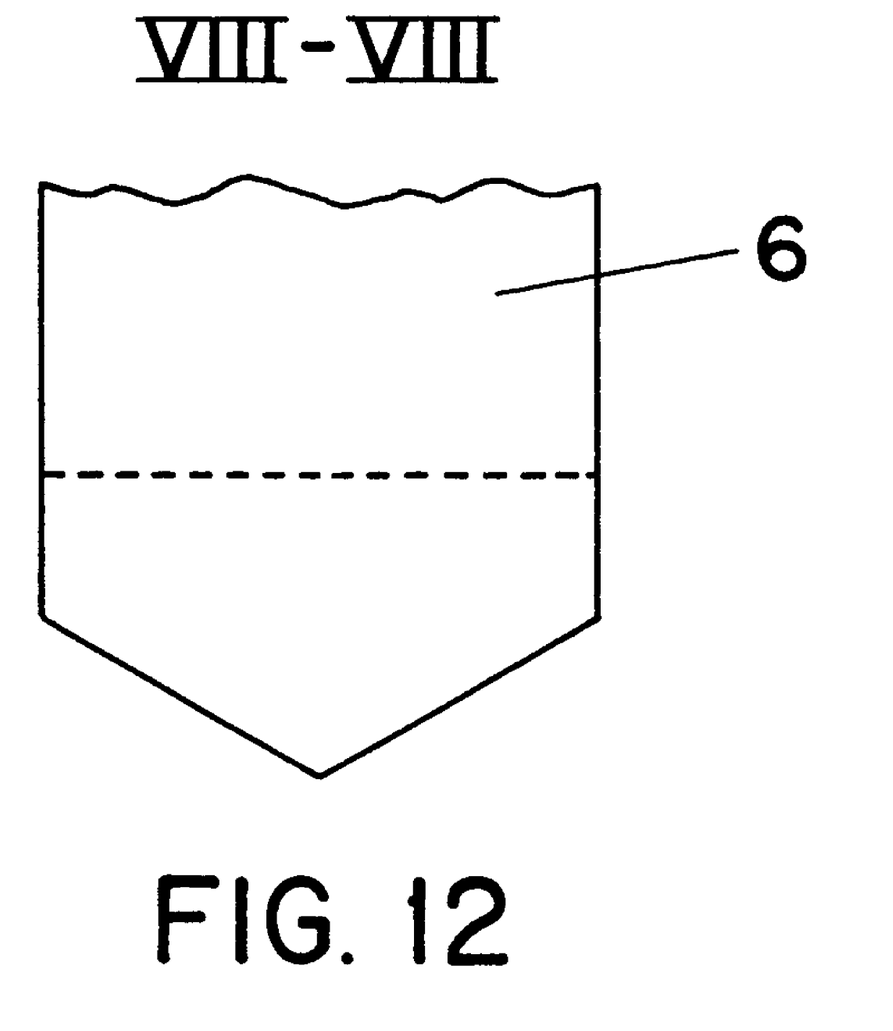
FIG. 12 shows an alternative embodiment of a view along the line VIII—VIII in FIG. 7.

Instead of a trapezoidal design of the lower part of the partition 6, in a further exemplary embodiment the latter may also have a V-shaped design, as illustrated with reference to FIG. 12. As illustrated in the design variant according to FIGS. 9 and 10, the V-shape may be modified in such a way that the lower end of the partition 6 between the vertical pass 4 with downward flow and the vertical pass 5 with upward flow is of stair-shaped design. As may be inferred from FIGS. 9 and 10, the lower end of the partition 6 is not angled here. However, it may, of course, be bent in another embodiment, as in the preceding examples, so that the effect on the secondary flow is reinforced even more.

If the gas duct 4 is additionally subdivided into at least two ducts which are separated from one another by side walls, then at least two flows, each with a double spiral, are obtained, so that, owing to this too, the separation of the dust particles is further reinforced.

Figure 11:
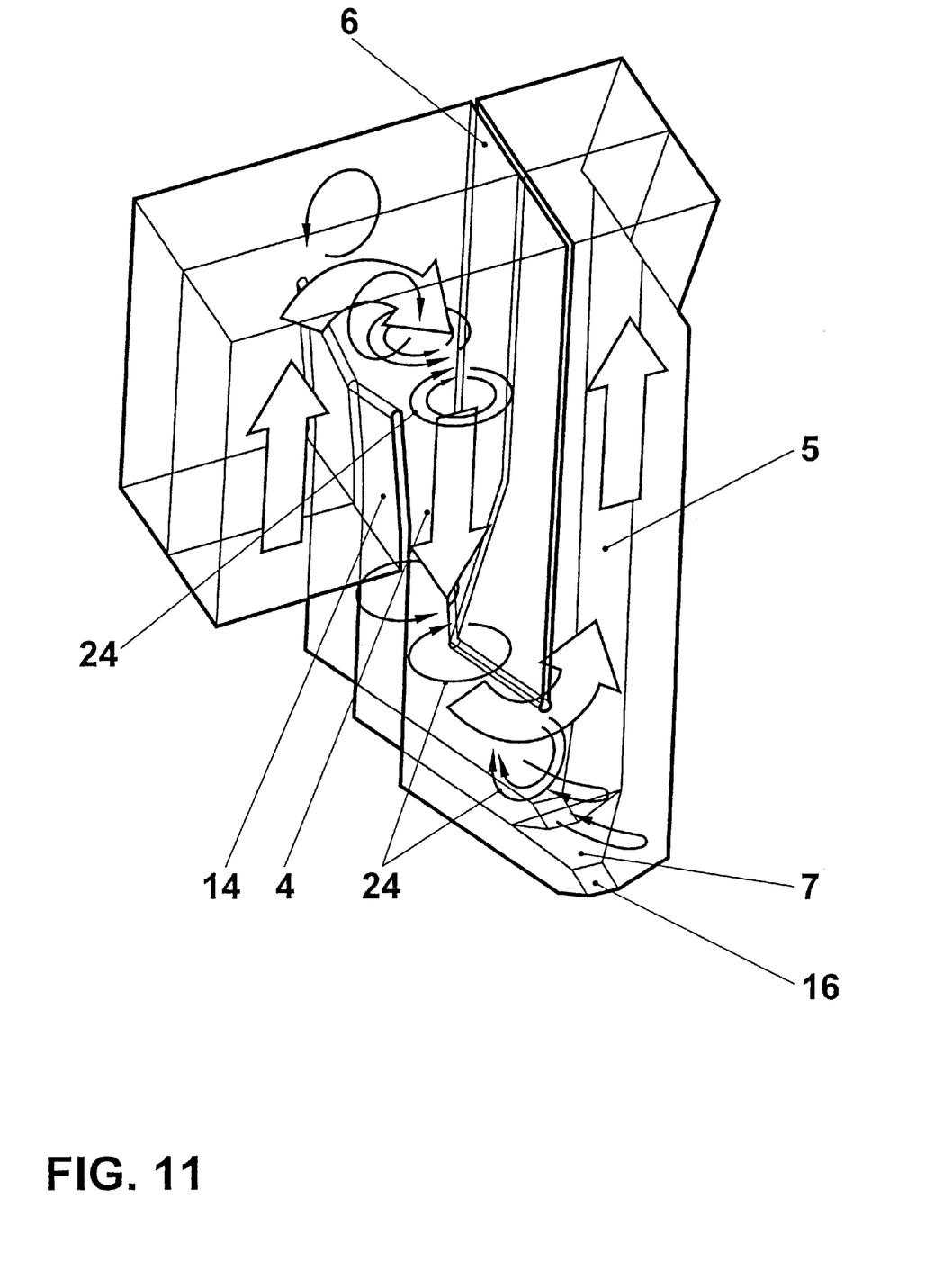
FIG. 11 shows a perspective illustration of the steam generator in a sixth design variant of the invention, with the profile of the secondary flow being marked.

Finally, FIG. 11 illustrates a design variant, in which, as well as the lower part of the second partition 6 being designed according to the invention, the upper part of the first partition 14 is additionally designed in such a way that the passage area for the flue gas 12 from the combustion chamber 1 to the vertical pass 4 with downward flow has a variable value over the width, the passage area being greater in the middle than on the outside. In this case, the upper end of the partition 14 may be, for example, V-shaped, stair-shaped or trapezoidal. The secondary flow is reinforced as early as in this region due to the special design of the upper end of the partition 14, thus having, in combination with the design according to the invention of the second partition 6, a particularly good effect on the efficient separation of dust from the flue gas flow during the deflection of the flue gases 12.

All the parts of the proposed deflection are cooled by the same natural circulation system which is also used for the boiler as a whole. Moreover, cleaning-off devices 25, preferably tapping mechanisms, known from the prior art are provided on the side walls for removing the dust, as illustrated in FIG. 1.

Of course, the invention is not restricted to the exemplary embodiments described. It may be applied to any type of dust-carrying ducts, in which the dust-laden gas undergoes flow deflection.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A steam generator, which comprises a combustion chamber, a radiation part and a convection part and which has at least two vertical gas passes following the combustion chamber, in each case with 180° deflection of the flue gas, the combustion chamber and the gas pass being separated from one another by means of a first partition and the two gas passes being separated from one another by means of a second partition, a funnel with at least one orifice for the discharge of dust being arranged in the region of the deflection of the flue gas from the vertical pass with downward flow to the vertical pass with upward flow, and a passage of the vertical pass with downward flow having a width and a length, said length being defined as a distance between said first and second partition, wherein a lower end of the second partition is shaped so that the passage area of the downward vertical pass at the lower end of the second partition has a variable length over its width, the length of the passage area being smaller at the middle of the width of the passage area than on ends of the width of the passage area.

2. The steam generator as claimed in claim 1, wherein the first partition is shaped at its upper end so that the passage area for the flue gas from the combustion chamber to the vertical pass with downward flow at the Upper end of the first partition has a variable length over its width, the passage area being greater in the middle of the width of the passage area than on the ends of the width of the passage area.

3. The steam generator as claimed in claim 1, wherein the lower end of the second partition and/or the upper end of the second partition and/or the upper end of the first partition is shaped in the form of a plowshare.

4. The steam generator as claimed in claim 1, wherein the lower end of the second partition and/or the upper end of the first partition is of V-shaped design.

5. The steam generator as claimed in claim 1, wherein the lower end of the second partition and/or the upper end of the first partition is of stair-shaped design.

6. The steam generator as claimed in claim 1, wherein the lower end of the second partition and/or the upper end of the first partition is of trapezoidal design.

7. The steam generator as claimed in claim 1, wherein the lower end of the second partition and/or the upper end of the first partition is angled in the direction of the vertical pass with downward flow.

8. The steam generator as claimed in claim 1, wherein the vertical gas pass with downward flow is divided into at least two ducts separated from one another by side walls.

9. The steam generator as claimed in claim 1, wherein at least two discharge orifices for the dust are provided at the lowest point of the deflection.

10. The steam generator as claimed in claim 1, wherein all the parts involved in gas deflection are integrated in the natural circulation system of the steam generator and wherein cleaning-off devices, preferably tapping mechanisms, are provided on the side walls for removing the dust.

* * * * *